US009154676B1

(12) United States Patent
Musec et al.

(10) Patent No.: US 9,154,676 B1
(45) Date of Patent: Oct. 6, 2015

(54) VIDEO CAMERA HOUSING FOR FOOTBALL HELMET

(71) Applicant: KRANOS IP CORPORATION, Litchfield, IL (US)

(72) Inventors: Jeff J. Musec, Edwardsville, IL (US); Leonard E. Van Houtin, Salem, IL (US); Louis A. Van Houtin, Iuka, IL (US)

(73) Assignee: KRANOS IP CORPORATION, Litchfield, IL (US)

( * ) Notice: Subject to any disclaimer, the term of this patent is extended or adjusted under 35 U.S.C. 154(b) by 20 days.

(21) Appl. No.: 14/220,785

(22) Filed: Mar. 20, 2014

(51) Int. Cl.
*H04N 5/225* (2006.01)
*A42B 3/04* (2006.01)
*A42B 3/12* (2006.01)
*A42B 3/20* (2006.01)
*A42B 3/30* (2006.01)

(52) U.S. Cl.
CPC ............ *H04N 5/2253* (2013.01); *A42B 3/0406* (2013.01); *A42B 3/125* (2013.01); *A42B 3/20* (2013.01); *A42B 3/30* (2013.01); *H04N 5/2252* (2013.01); *H04N 5/2257* (2013.01); *A63B 2243/007* (2013.01)

(58) Field of Classification Search
CPC . H04N 5/2252; H04N 5/2253; H04N 5/2257; A42B 3/0406; A42B 3/125; A42B 3/20; A42B 3/30; A63B 2243/007
See application file for complete search history.

(56) References Cited

U.S. PATENT DOCUMENTS

| | | | | |
|---|---|---|---|---|
| 6,819,354 | B1* | 11/2004 | Foster et al. | 348/157 |
| D640,304 | S * | 6/2011 | Green et al. | D16/242 |
| 8,556,831 | B1* | 10/2013 | Faber et al. | 600/587 |
| 2006/0277666 | A1* | 12/2006 | Gertsch et al. | 2/424 |
| 2011/0131710 | A1* | 6/2011 | Maddux et al. | 2/424 |
| 2013/0333100 | A1* | 12/2013 | Erb et al. | 2/425 |
| 2013/0342981 | A1* | 12/2013 | Cox et al. | 361/679.01 |
| 2014/0189937 | A1* | 7/2014 | Pietrzak et al. | 2/411 |
| 2014/0223645 | A1* | 8/2014 | Rogers et al. | 2/422 |
| 2014/0362244 | A1* | 12/2014 | Martin | 348/211.2 |
| 2015/0061874 | A1* | 3/2015 | Kim | 340/573.1 |
| 2015/0145990 | A1* | 5/2015 | Jones | 348/143 |

OTHER PUBLICATIONS

U.S. Appl. No. 12/716,769, filed Mar. 3, 2010, L.E. Maddux et al.
U.S. Appl. No. 13/526,077, filed Jun. 18, 2012, R. Erb et al.

* cited by examiner

*Primary Examiner* — Daniel M Pasiewicz
(74) *Attorney, Agent, or Firm* — Notaro, Michalos & Zaccaria P.C.

(57) ABSTRACT

Football helmet with video system has a rigid shell with front and back portions. An impact absorbing pad assembly and underlying comfort liner assembly are removably attached in the shell. A face guard of connected bars has a center bar connected to the front portion of the shell by one or more connectors with a nose bumper between the center bar and the shell. The nose bumper has a concave inner surface engaged flat against a convex outer surface of the front portion and a video optics housing extending forwardly of the nose bumper and containing an imager. A battery housing is connected in the shell for a battery, a circuitry housing is connected to the shell for video camera circuitry and wiring connects the imager and the battery housing to the video circuitry.

16 Claims, 7 Drawing Sheets

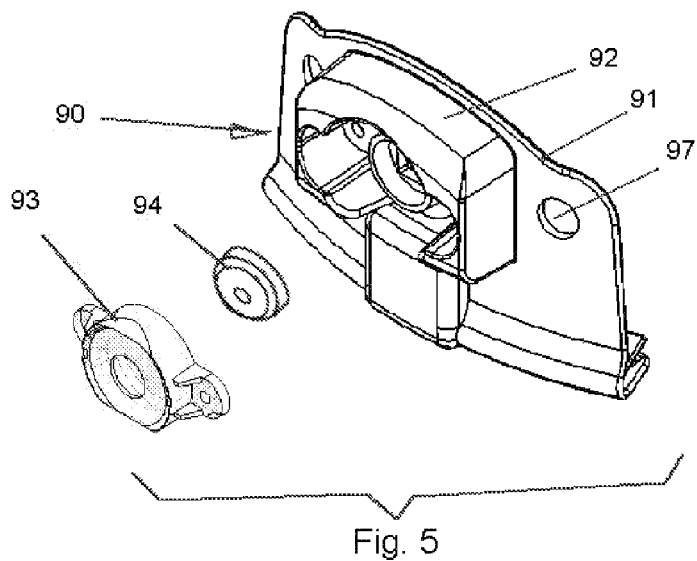
Fig. 5
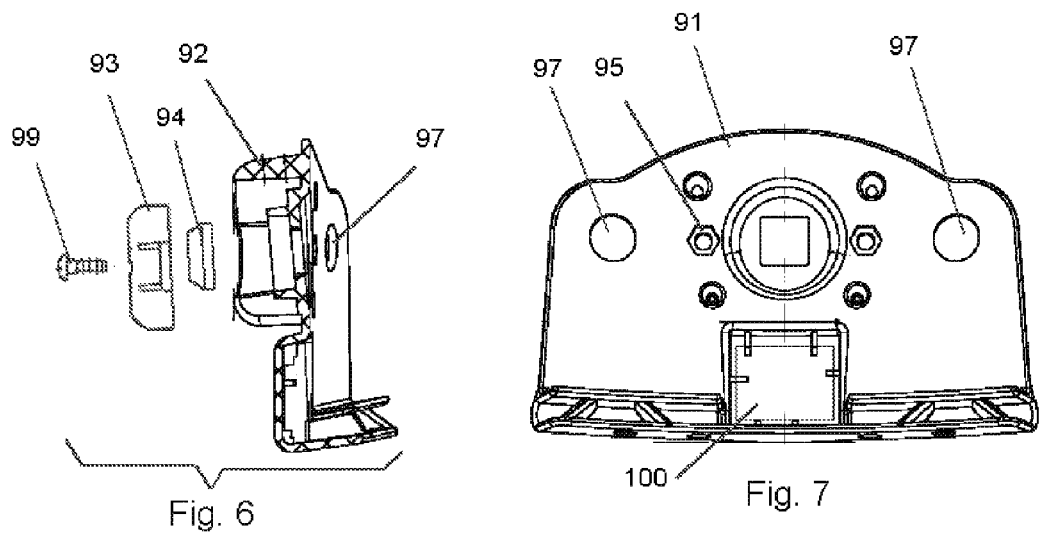
Fig. 6
Fig. 7

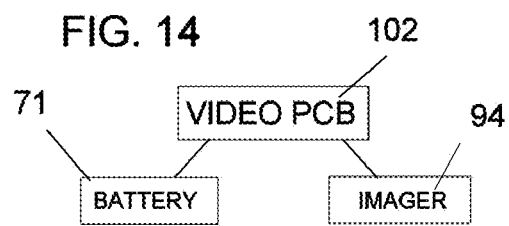

VIDEO CAMERA HOUSING FOR FOOTBALL HELMET

FIELD AND BACKGROUND OF THE INVENTION

The present invention relates generally to the field of sports helmets, and in particular, to a new and useful video camera housing and helmet combination for a football helmet that meets National Operating Committee on Standards for Athletic Equipment (NOCSAE) standards and is otherwise specially suited to use on the football field.

All professional and scholastic level football helmets must meet NOCSAE standards. In view of these stringent requirements, care must be take before adding or removing structures to such helmets.

U.S. Pat. No. 6,819,354 to Foster et al., assigned to Omnivision Technologies, Inc. and entitled Completely integrated helmet camera, discloses a camera housing mountable to a helmet. The camera housing contains a single-chip image sensor and includes an attaching unit that is structured to allow the camera housing to be attached to an existing structure of the helmet, such as to a face mask of a helmet. The camera housing extends above the face guard and forward of the helmet shell.

GoPro brand video cameras have found favor with various active people and sports for mounting on head gear, equipment and garments, to record action videos of the sport or activity. Some helmet wearers have attach these commercially available video systems to their helmets. This may endanger the wearer, degrade the function of the helmet and void the helmet's manufacturer's warranty.

In view of the ever growing desire and advantage of video recording for sports training and action videos, a need exists for a video camera and football helmet combination that satisfied all relevant safety requirements and standards.

SUMMARY OF THE INVENTION

It is an object of the present invention to provide a video camera capacity to a football helmet without impairing the safety of the helmet and without significantly changing the helmet's profile from all angle.

Another object of the invention is to provide a football helmet with an integrated video system that is ready for full-contact practice and game play and which can be sold in a completed condition with the video system installed and the helmet being NOCSAE compliant.

Accordingly, another object of the invention is to provide a football helmet with integrated video system that comprises: a rigid shell adapted to cover the head of a wearer, the rigid shell having an outer surface and an inner surface, the shell having a front portion with a convex outer surface, a crown portion, a pair of opposite side portions, and a back portion with a convex outer surface; an impact absorbing pad assembly removably attached to the inner surface of the rigid shell; a comfort liner assembly removably attached to an inner surface of at least part of the impact absorbing pad assembly; a face guard comprising a cage of connected together metal bars having a pair of side parts connected to respective side portions of the shell, and an upper part having a center bar connected to the front portion of the shell; a nose bumper connected to the front portion of the shell, the nose bumper having an inner concave surface engaged flat against the outer convex surface of the front portion of the shell, a video optics housing connected to and extending forwardly of the nose bumper, the video optics housing containing an imager; at least one face guard connector connecting the center bar to the face guard over the nose bumper and to the front portion of the shell; a battery housing connected to the inner surface of the shell for supporting a battery; a circuitry housing connected to the shell; video camera circuitry in the housing; and wiring connecting the imager and battery housing to the video circuitry.

An still further object of the invention is to provide a football helmet with integrated video system that is simple in design, rugged in construction and that satisfies the requirements for football helmet standards.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a front, top, side perspective view of nose bumper with video optics housing of the invention;

FIG. 6 is side, exploded view of nose bumper with video optics housing of the invention;

FIG. 7 is a rear view of nose bumper;

FIG. 14 is a wiring diagram for electronic parts for the video system that are housed in the various parts of the invention.

DESCRIPTION OF THE PREFERRED EMBODIMENTS

Figure 1:
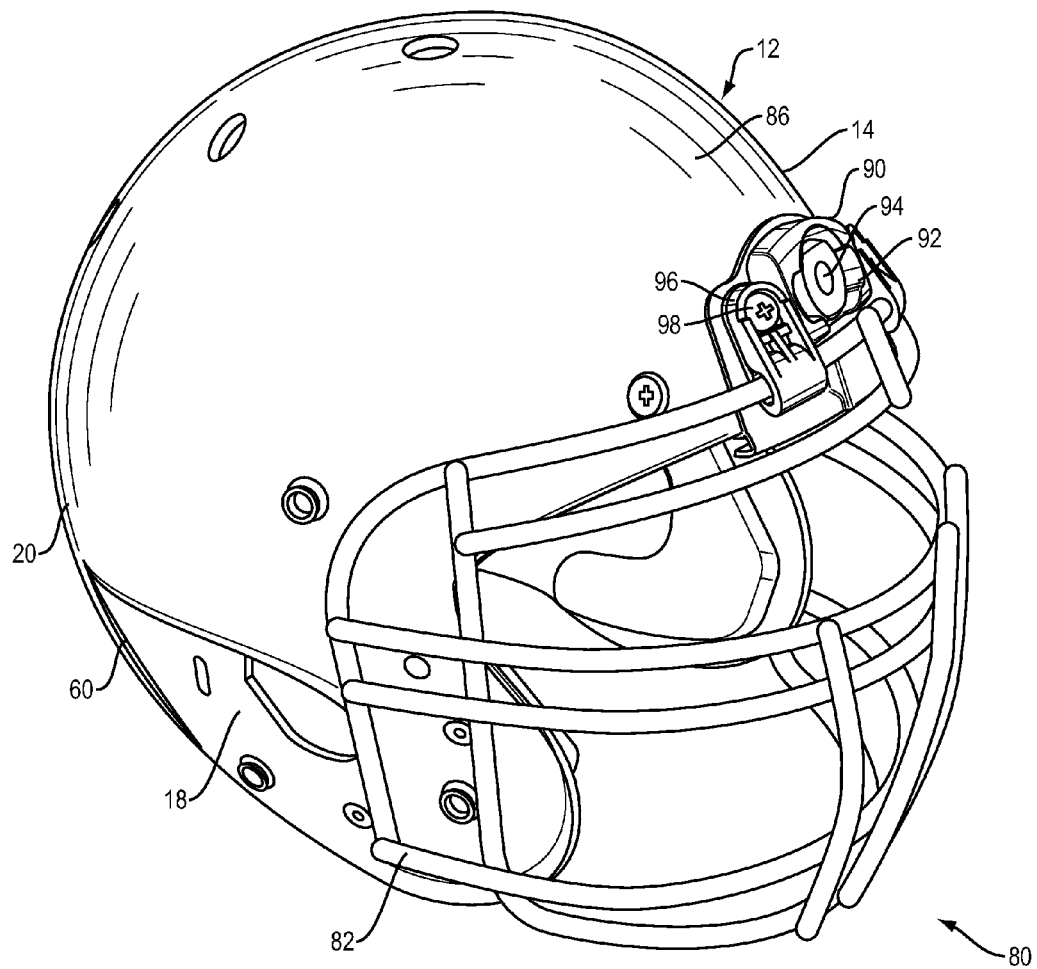
FIG. 1 is a front, top, side perspective view of a football helmet for an integrated video system according to our invention.

Referring now to the drawings, in which like reference numerals are used to refer to the same or similar elements, FIGS. 1 to 4 show a football helmet with integrated video system that comprises a rigid shell 12 adapted to cover the head of a wearer. The rigid shell has an outer surface and an inner surface, and includes a front portion 14 with a convex outer surface, a crown portion 16, a pair of opposite side portions 18, and a back portion 20. An impact absorbing pad assembly 30 is removably attached to the inner surface of the rigid shell and a comfort liner assembly 40 is removably attached to an inner surface of at least part of the impact absorbing pad assembly.

U.S. patent application Ser. No. 13/526,077 filed Jun. 18, 2012, which is incorporated herein by reference, discloses additional details of an embodiment of a impact absorbing pad assembly and comfort liner assembly that can be used with the invention.

The helmet includes a face guard 80 comprising a cage of connected together metal bars having a pair of side parts 82 connected to respective side portions 18 of the shell 12, and an upper part 84 having a center bar 86 connected to the front portion 14 of the shell. A nose bumper 90, which is preferably white or translucent, is connected to the front portion 14 of the shell, the nose bumper having a base portion 91 with an inner concave surface engaged flat against the outer convex surface of the front portion 14 of the shell. A video optics housing 92 is connected to and extends forwardly of the base portion 91 of the nose bumper 90, the video optics housing containing an imager 94 with foam ring best shown in FIGS. 5 and 6. The optics housing 92 may be made as one piece with, or connected as a separate but connected piece to the base portion 91 of the nose bumper 90. A clear imager or sensor cover 93, covers the front and sides of imager 94 and holds it to housing 92 by screws 99 that are threaded into nuts 95 held in recesses on the inner surface of base portion 91 of nose bumper 90.

As best shown in FIGS. 1 and 5, housing 92 has rounded outer contours and defines a deep recess around the imager 94 and enclosing imager cover 93. In this way at least the sides, top and part of the bottom of the imager cover are surrounded, to protect it and the enclosed imager 94 from impacts. This is done without overly enlarging the profile of the unit and, importantly, while still satisfying NOCSAE standards.

As shown in FIG. 7, nose bumper 90 also includes a circuit board recess below the location of the imager in housing 92, for an imager interface circuit board 100 that is part of the overall electronics package of known design to be used with the invention. The video imaging and electronics package components to be integrated with the football helmet of the invention, are known to those skilled in the art and are not disclosed in detail here.

Preferably, the base and housing portions 91 and 92 are injection molded as one piece of white SABIC (a trademark) polycarbonate EXT1414T and cover 93 is made of clear SABIC polycarbonate HF1110R.

At least one, but preferably two face guard connectors 96, such as standard plastic loop connectors or other forms of connector, connect the center bar 86 to the face guard 80 over the nose bumper 90 and to the front portion 14 of the shell 12. For the preferred case where two connectors 96 are sued, they are on opposite sides on the video optics housing 92. Each are connected by screws 98, extending through holes in the loop connectors 96 and through holes 97 in the nose bumper 90, and are threaded to the nut portion of a T-nut of known design that is engaged in a corresponding hole in the front portion 14 of the helmet shell 12. See U.S. patent application Ser. No. 13/526,077 for details of the loop connector, screw and T-nut structure for connecting face guards to helmets, and U.S. patent application Ser. No. 12/716,769 filed Mar. 3, 2010 for details of an alternate quick turn connector for performing the same task, U.S. patent application Ser. No. 12/716,769 also being incorporated herein by reference.

Figure 2:
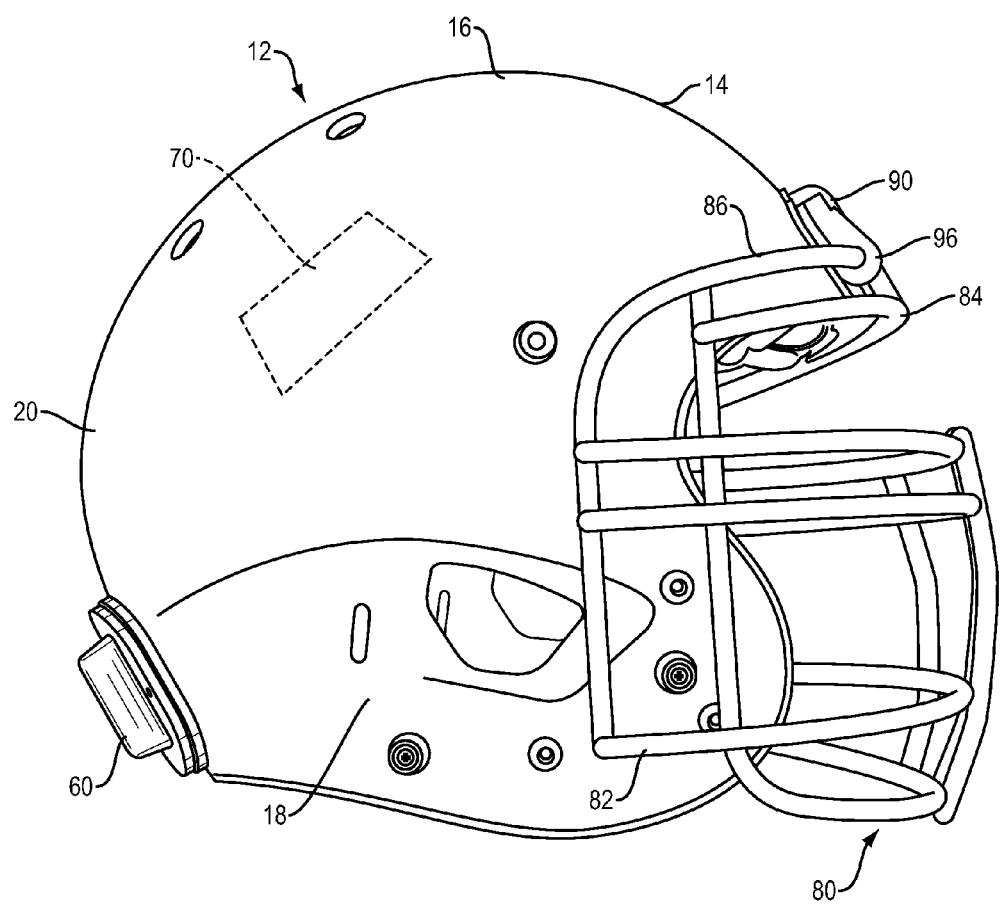
FIG. 2 is a side elevational view thereof.
Figure 3:
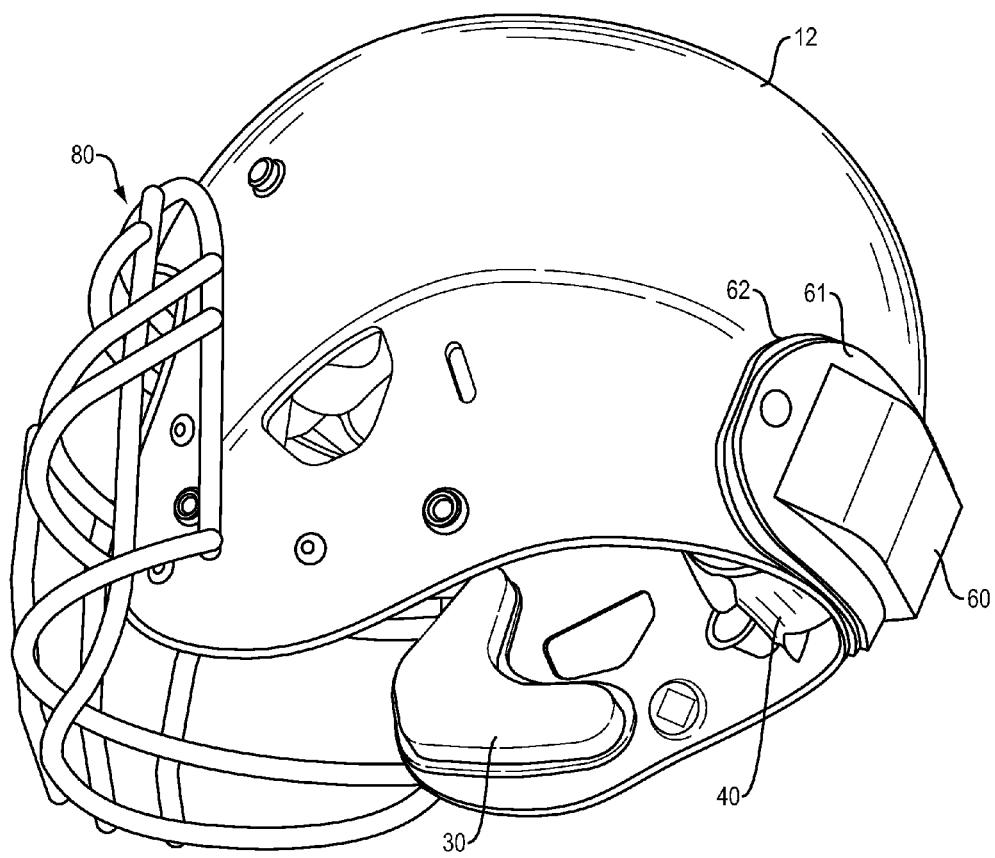
FIG. 3 is a rear, bottom, side perspective view thereof.

A battery housing 70 is connected to the inner surface of the shell 12, between, under and/or among some of the pads of the impact absorbing pad assembly 30, for supporting a rectangular battery 71 in FIG. 14, for the video system. A circuitry housing 60 is connected to the shell, preferable near a lower edge of the back portion 20 by a pair of screws threaded into T-nuts in the shell as best shown in FIGS. 2 and 3. A video camera printed circuitry board or video PCB 102, is provided in the housing 60 and wiring is provided for connecting the imager 94 and the battery housing 70 with battery 71, to the video circuitry 102 as shown in FIGS. 8 and 14.

Figure 4:
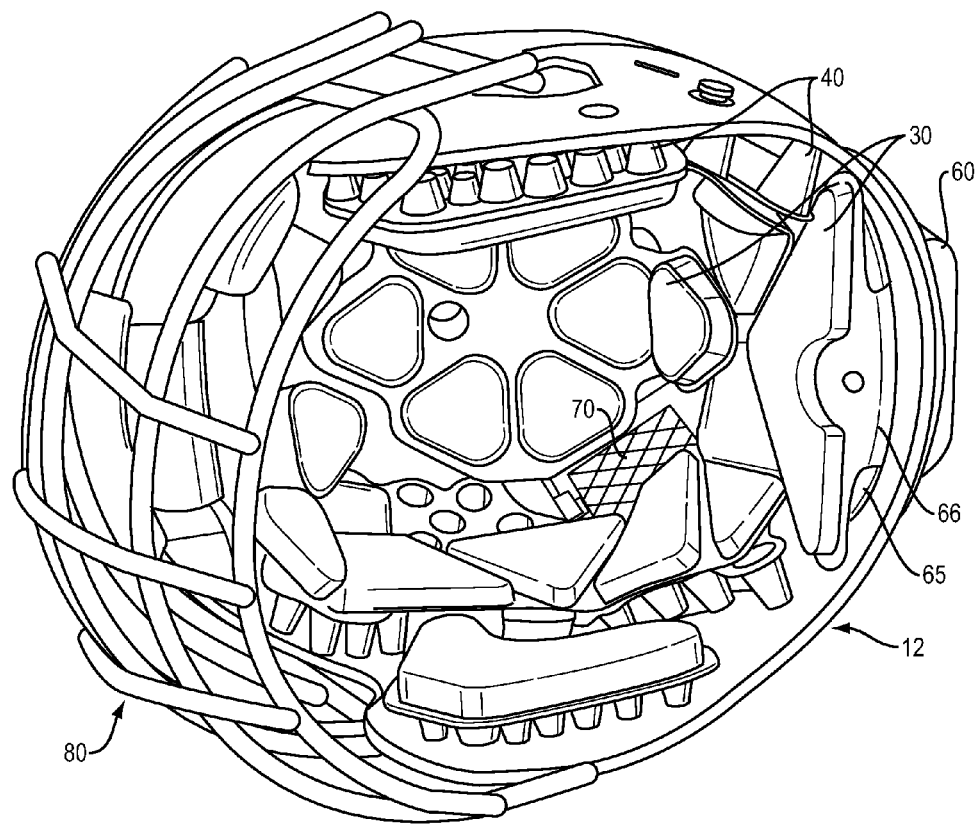
FIG. 4 is a bottom, front perspective view thereof.
Figure 9:
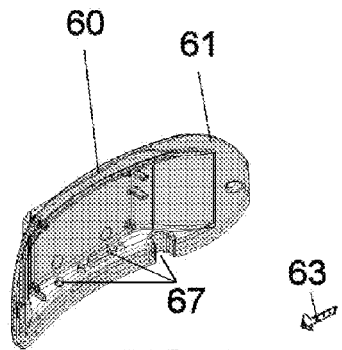
FIG. 9 is a rear view of the video circuitry housing.
Figure 11:
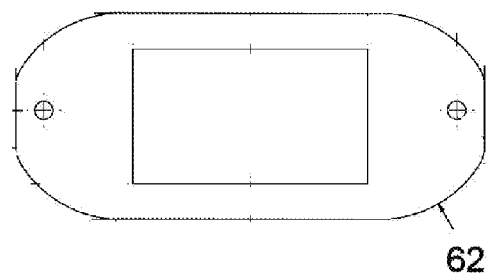
FIG. 11 is a side view of a gasket of the circuitry housing.
Figure 12:
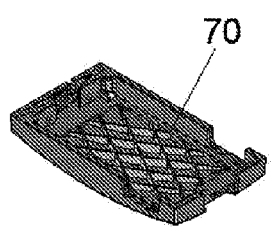
FIG. 12 is an inside perspective view of a battery housing of the invention.
Figure 13:
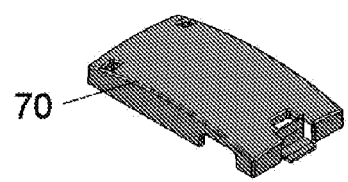
FIG. 13 is an outside perspective view of the battery housing of the invention.

As best shown in FIGS. 4, 11 and 12, the battery housing 70 is made of ABS plastic and has a convex outer surface that is connected, for example by hook and loop fastening tabs to the inside concave surface of the helmet 12, preferably to one side of the crown 16 and toward the rear of the shell where it is least likely to interfere with the shock absorbing function of the pad assembly 30 in the vicinity of the battery housing 70. The battery 71 (in FIG. 14), may be removed for charging to avoid interrupting use of the helmet by a player.

Figure 10:
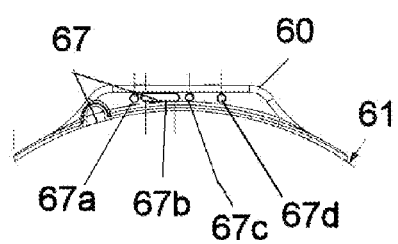
FIG. 10 is a bottom view of the video circuitry housing.

As best shown in FIGS. 8, 9, 10 and 11, the video circuitry housing 60 has a generally rectangular central portion defining a hollow void for receiving the video PCB 102 to complete the circuitry needed for video capture and saving. One or more ports 67 are defined in the bottom of the central portion of housing 60 to allow passthrough of wiring, for allowing insert and removal of memory cards such as an SD card or the like, and for control buttons. Housing 60 also includes a curved flange portion 61 with a concave inner surface that generally conforms to the outer convex surface of the back portion 20 of shell 12. As examples and as shown in FIG. 10, the ports 67 include a port 67a for a record button, a slot 67b for an SD card (not shown), a retaining hole 67c for an SD plug and a port 67d for a power button. A weather resistant rubber plug (not shown) plugs into the SD slot and is retained in hole 67c to protect the video circuitry, controls and memory components from the elements.

Figure 8:
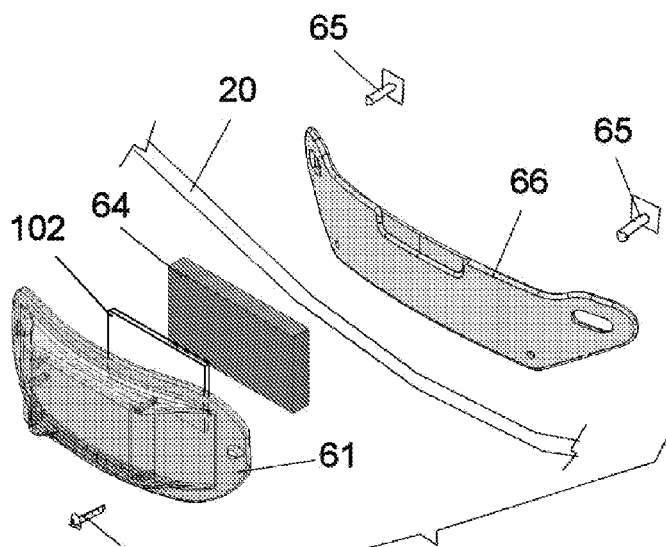
FIG. 8 is an exploded view of a video circuitry housing and associated parts of the invention.

A pair of holes in flange 61, on opposite sides of the central portion, receive rear housing screws 63, that extend through holes in the helmet shell and through corresponding holes in a rear liner attachment 66 shown in FIG. 8, and then are threaded into respective T-nuts 65 inside the helmet. A rear gasket 62 (shown in FIG. 11 but not in FIG. 8) is interposed between flange 61 and back portion 20 on the shell to help cushion the circuitry in housing 60 from impacts to the helmet. A resilient rectangular rear housing pad 64, of ⅜" polyether polyurethane foam is pressed into the void in the central portion of the housing 60, between the shell 12 and the circuit board (not shown), to further secure the circuit board against impacts. Pad 64 extends in a corresponding rectangular opening in gasket 62 so that the pad engages directly against the shell surface.

Housing 60 with its central portion and its flange 61 are made of clear or translucent SABIC polycarbonate EXL1414T. Gasket 62 is made of black ⅛" or ¼" VN1485 with pressure sensitive adhesive. Rear liner 66 is made of white, polymeric, non-migrating PVC 85 Shore A. The video circuitry housing 60 is transparent or translucent for viewing one or more LEDs on the video circuitry 102, the circuitry having or being painted to have a color to match a color of the outer surface of the helmet shell so it looks like a part of the helmet.

While a specific embodiment of the invention has been shown and described in detail to illustrate the application of the principles of the invention, it will be understood that the invention may be embodied otherwise without departing from such principles.

What is claimed is:

1. A football helmet for integrated video system comprising:

a rigid shell adapted to cover the head of a wearer, the rigid shell having an outer surface and an inner surface, the shell having a front portion with a convex outer surface, a crown portion, a pair of opposite side portions, and a back portion with a convex outer surface;

an impact absorbing pad assembly removably attached to the inner surface of the rigid shell;

a comfort liner assembly removably attached to an inner surface of at least part of the impact absorbing pad assembly;

a face guard comprising a cage of connected together bars having a pair of side parts connected to respective side portions of the shell, and an upper part having a center bar connected to the front portion of the shell;

a nose bumper connected to the front portion of the shell, the nose bumper having a base portion with a concave inner surface engaged flat against the convex outer surface of the front portion of the shell, a video optics housing connected to and extending forwardly of the base portion of the nose bumper, the video optics housing containing an imager;

at least one face guard connector for connecting the center bar to the face guard over the nose bumper and to the front portion of the shell;

a battery housing connected to the inner surface of the shell for supporting a battery;

a circuitry housing connected to the shell, the circuitry housing containing video camera circuitry; and wiring connecting the imager and battery housing and to the video circuitry.

2. The football helmet with integrated video system according to claim 1, wherein the nose bumper includes an imager cover connected to the video optics housing for covering the imager, the video optics housing having rounded outer contours and defining a recess around the imager and cover for at least partly surrounding the imager and cover for protection from impacts.

3. The football helmet with integrated video system according to claim 1, wherein the battery housing has a convex outer surface that is connected to an inside concave surface of the helmet.

4. The football helmet with integrated video system according to claim 1, wherein the video circuitry housing has a central portion defining a hollow void for receiving a video circuit board, and a curved flange portion with a concave inner surface connected to an outer convex surface of the back portion of the shell.

5. The football helmet with integrated video system according to claim 1, wherein the video circuitry housing has a central portion defining a hollow void for receiving a video circuit board, and a curved flange portion with a concave inner surface connected to an outer convex surface of the back portion of the shell, the helmet including a rear liner attachment inside the shell, a rear gasket between flange and the shell and a resilient pad pressed into the void in the central portion of the housing for engaging a circuit board in the void, the flange, gasket and attachment being connected to each other.

6. The football helmet with integrated video system according to claim 1, wherein the nose bumper and video circuitry housing are one of white, transparent and translucent.

7. The football helmet with integrated video system according to claim 1, wherein the video circuitry housing has a central portion defining a hollow void for receiving a video circuit board, and a curved flange portion with a concave inner surface connected to an outer convex surface of the back portion of the shell, and including at least one port defined in a bottom or a top of the central portion of the housing for connecting power or data cables.

8. The football helmet with integrated video system according to claim 1, wherein the nose bumper includes an imager cover connected to the video optics housing for covering the imager, the video optics housing having rounded outer contours and defining a recess around the imager and cover for at least partly surrounding the imager and cover for protection from impacts, the video circuitry housing having a central portion defining a hollow void for receiving a video circuit board, and a curved flange portion with a concave inner surface connected to an outer convex surface of the back portion of the shell.

9. A football helmet for video system comprising:

a rigid shell with front and back portions;

an impact absorbing pad assembly and underlying comfort liner assembly removably attached in the shell;

a face guard of connected bars having a center bar connected to the front portion of the shell by at least one connectors;

a nose bumper between the center bar and the shell, the nose bumper having a concave inner surface engaged flat against a convex outer surface of the front portion, the nose bumper having a video optics housing extending forwardly of a remainder of the nose bumper, the video optics housing containing an imager;

a battery housing connected in the shell for a battery;

a circuitry housing connected to the shell for video camera circuitry; and wiring connecting the imager and the battery housing to the video circuitry.

10. The football helmet with video system according to claim 9, wherein the nose bumper includes an imager cover connected to the video optics housing for covering the imager, the video optics housing having rounded outer contours and defining a recess around the imager and cover for at least partly surrounding the imager and cover for protection from impacts.

11. The football helmet with video system according to claim 9, wherein the battery housing has a convex outer surface that is connected to an inside concave surface of the helmet.

12. The football helmet with video system according to claim 9, wherein the video circuitry housing has a central portion defining a hollow void for receiving a video circuit board, and a curved flange portion with a concave inner surface connected to an outer convex surface of the back portion of the shell.

13. The football helmet with video system according to claim 9, wherein the video circuitry housing has a central portion defining a hollow void for receiving a video circuit board, and a curved flange portion with a concave inner surface connected to an outer convex surface of the back portion of the shell, the helmet including a rear liner attachment inside the shell, a rear gasket between flange and the shell and a resilient pad pressed into the void in the central portion of the housing for engaging a circuit board in the void, the flange, gasket and attachment being connected to each other.

14. The football helmet with video system according to claim 9, wherein the video circuitry housing is transparent or translucent for viewing one or more LEDs on the video circuitry, the circuitry having a color to match a color of the outer surface of the helmet shell.

15. The football helmet with video system according to claim 9, wherein the video circuitry housing has a central portion defining a hollow void for receiving a video circuit board, and a curved flange portion with a concave inner surface connected to an outer convex surface of the back portion of the shell, and ports for wiring, memory card, and control buttons.

16. The football helmet with video system according to claim 9, wherein the nose bumper includes an imager cover connected to the video optics housing for covering the imager, the video optics housing having rounded outer contours and defining a recess around the imager and cover for at least partly surrounding the imager and cover for protection from impacts, the video circuitry housing having a central portion defining a hollow void for receiving a video circuit board, and a curved flange portion with a concave inner surface connected to an outer convex surface of the back portion of the shell.

* * * * *